United States Patent
Yhuellou et al.

(10) Patent No.: US 10,717,552 B2
(45) Date of Patent: Jul. 21, 2020

(54) DEVICE AND LOCKING OF A FUELING DEVICE

(71) Applicant: AIRBUS SAFRAN LAUNCHERS SAS, Paris (FR)

(72) Inventors: Olivier Yhuellou, St-Marcel (FR); Georges Verdier, Tourny (FR); Olivier Adam, St. Pierre de Bailleul (FR); William Barre, Louviers (FR)

(73) Assignee: ARIANEGROUP SAS, Paris (FR)

( * ) Notice: Subject to any disclaimer, the term of this patent is extended or adjusted under 35 U.S.C. 154(b) by 481 days.

(21) Appl. No.: 15/529,836

(22) PCT Filed: Nov. 23, 2015

(86) PCT No.: PCT/FR2015/053168
§ 371 (c)(1),
(2) Date: May 25, 2017

(87) PCT Pub. No.: WO2016/083713
PCT Pub. Date: Jun. 2, 2016

(65) Prior Publication Data
US 2017/0260929 A1    Sep. 14, 2017

(30) Foreign Application Priority Data
Nov. 28, 2014 (FR) .................................... 14 61646

(51) Int. Cl.
*B64G 5/00* (2006.01)
*F02K 9/56* (2006.01)
*F02K 9/58* (2006.01)
(52) U.S. Cl.
CPC ................ *B64G 5/00* (2013.01); *F02K 9/566* (2013.01); *F02K 9/58* (2013.01)

(58) Field of Classification Search
CPC .............. F02K 9/566; F02K 9/58; B64G 5/00
(Continued)

(56) References Cited

U.S. PATENT DOCUMENTS

| 3,183,468 | A | * | 5/1965 | Hennessey, Jr. | ........ | F41F 3/055 |
| | | | | | | 439/157 |
| 5,017,912 | A | * | 5/1991 | Willis | .................... | G01N 27/20 |
| | | | | | | 340/652 |

(Continued)

FOREIGN PATENT DOCUMENTS

| EP | 0371867 A1 | 6/1990 |
| FR | 2685903 A1 | 7/1993 |
| FR | 2943627 A1 | 10/2010 |

OTHER PUBLICATIONS

International Search Report issued in corresponding International Application No. PCT/FR2015/053168, dated Feb. 23, 2016 (4 pages—including English translation).

*Primary Examiner* — Todd E Manahan
*Assistant Examiner* — Kyle Robert Thomas
(74) *Attorney, Agent, or Firm* — Bookoff McAndrews, PLLC

(57) ABSTRACT

The invention relates to the field of feeding devices, in particular for feeding rockets on the ground. A feeding device (4) of the invention comprises at least two mutually complementary feeding connectors (5, 6), a breakable connection member (15) connecting these two feeding connectors (5, 6) together and presenting a breakable section (15c) between these two feeding connectors (5, 6), and a force transmission member (16) connected to said breakable section (15c) in such a manner as to transmit a breaking load thereto in order to unlock the connection between the two feeding connectors (5, 6). During unlocking, a breaking load transmitted by the force transmission member (16) thus serves to break the breakable section (15c).

8 Claims, 5 Drawing Sheets

(58) Field of Classification Search
USPC ............... 89/1.811; 137/68.11, 68.14, 68.15; 285/1, 2, 3, 4, 304
See application file for complete search history.

(56) References Cited

U.S. PATENT DOCUMENTS

| | | | | |
|---|---|---|---|---|
| 5,562,130 | A * | 10/1996 | Peha | B64G 1/402 |
| | | | | 137/205 |
| 6,739,628 | B2 * | 5/2004 | Kanner | F16L 9/00 |
| | | | | 285/3 |
| 8,505,429 | B2 * | 8/2013 | Malapel | B64G 5/00 |
| | | | | 89/1.811 |
| 2002/0180207 | A1 * | 12/2002 | Kanner | F16L 9/00 |
| | | | | 285/3 |
| 2012/0132060 | A1 * | 5/2012 | Malapel | B64G 1/402 |
| | | | | 89/1.811 |

* cited by examiner

DEVICE AND LOCKING OF A FUELING DEVICE

CROSS-REFERENCE TO RELATED APPLICATIONS

This application is the U.S. national phase entry under 35 U.S.C. § 371 of International Application No. PCT/FR2015/053168, filed on Nov. 23, 2015, which claims priority to French Patent Application No. 1461646, filed on Nov. 28, 2014, the entireties of which are herein incorporated by reference.

FIELD OF THE INVENTION

The present invention relates to the field of feeding devices, in particular for feeding rockets on the ground.

In this context, the term "rocket" is used broadly and also extends to vehicles having at least one air breathing propulsion stage, and not just to vehicles making use of non-air breathing rocket engines only. Such a rocket may in particular be a launcher for putting a payload onto a trajectory that is orbital, extra-orbital, or suborbital.

BACKGROUND

On the ground, on a launch ramp or pad, such a rocket is often connected to umbilical ducts for feeding it with propellants, pressurizing fluids, and/or electricity until the moment it lifts off. Those ducts may also provide other services, such as for example conveying data between the rocket and a control station. In order to make a connection between such umbilical ducts and the rocket, they present pairs of mutually complementary connectors often referred to as "valve plates" because of the presence of valves presenting fluids from flowing when the connectors separate.

On certain current rockets, such as for example launchers of the Ariane 5 family, at least some of these pairs of mutually complementary feeding connectors are separated before igniting the propulsion engines of the first stage. Consequently, it is normally necessary to verify that they have been disconnected before the rocket lifts off. And above all, in the event of liftoff being aborted after separation of the feeding connectors, and in particular when the tanks of the rocket contain cryogenic liquids, in particular propellants, it typically becomes necessary to empty those tanks via other connectors and also to replace the feeding connectors. Unfortunately, this involves intervention by means that are expensive and also prevents the rocket from being used during a precious length of time.

SUMMARY

The present disclosure seeks to remedy those drawbacks. In particular, the disclosure seeks to provide a feeding device having at least two mutually complementary feeding connectors, suitable in particular for feeding a rocket on the ground, and capable of being unlocked in a manner that is extremely reliable in response to relative movement between two elements, such as for example of a rocket moving relative to its launch pad while the rocket is actually lifting off.

In at least one embodiment, this object is achieved by means of the fact that the feeding device also comprises a breakable connection member connecting together said two feeding connectors and presenting a breakable section between these two feeding connectors, and a force transmission member connected to said breakable section of the breakable connection member so as to transmit a twisting breaking load thereto in order to unlock the connection between the two feeding connectors. By means of these provisions, unlocking can thus be performed in a manner that is simple, by breaking the connection member in its breakable section, with this being caused by the twisting load transmitted by the force transmission member.

In particular, said force transmission member may be a lever substantially perpendicular to said main axis of the connection member. The term "substantially perpendicular" is used in the present context to mean that the orientation of this main axis differs from the orientation of an axis orthogonal to the plane of rotation of the lever by no more than 5° or 10°, for example. Thus, the breaking load may be transmitted to the breakable section of the connection member with the length of the lever providing at least some mechanical advantage to this breaking force so that a moderate force at the end of the arm of this lever suffices to break the breakable section of the breakable member in twisting. Furthermore, because of this configuration, the force transmission member may be actuated by a force that is orthogonal to the main axis of the connection member, thereby simplifying the arrangement of the feeding device, in particular for a rocket feeding device. Apart from the lever, other devices, such as pulleys or capstans may also contribute to providing mechanical advantage to the breaking force.

Furthermore, said connection member is hollow, forming a duct between said two ends. Thus, the connection member may also be used to transfer fluids, in particular a propellant or a pressurization gas, from one side of the feeding device to the other.

Said feeding connectors may be configured to connect together in substantially leaktight manner ducts for at least one fluid, in particular a liquid, and more particularly a propellant.

Furthermore, the feeding device may also comprise at least one resilient spring arranged in such a manner as to move said two connectors apart after the connection member has broken, thus constituting means that are particularly simple and effective for separating the two connectors. Nevertheless, other types of actuator, e.g. magnetic, electric, or fluid flow actuators may also be envisaged as alternatives or in addition to actuation by means of a resilient spring. It is also possible to envisage completely omitting an actuator, with the connectors possibly being separated solely by gravity and/or inertia.

Finally, the feeding device may also comprise a traction line connected to the force transmission member. Thus, the feeding connector may be unlocked in a manner that is simple, reliable, and effective by traction from the traction line on the force transmission member, which traction may in particular be the result of the rocket moving vertically on liftoff.

The disclosure also provides a method of unlocking a feeding device, wherein a twisting breaking load transmitted by a force transmission member serves to break a breakable section of the breakable connection member, thus breaking a connection between two mutually complementary feeding connectors of said feeding device. In particular, said force transmission member may be a lever substantially perpendicular to a main axis of the connection member connecting its two ends together, the lever transmitting a twisting breaking load to the breakable connection member. This method may be used in particular for unlocking a rocket feeding device that initially connects said rocket to feeding services on the ground.

BRIEF DESCRIPTION OF THE DRAWINGS

The invention can be well understood and its advantages appear better on reading the following detailed description of an embodiment given by way of non-limiting example. The description refers to the accompanying drawings, in which.

DETAILED DESCRIPTION

Figure 1:
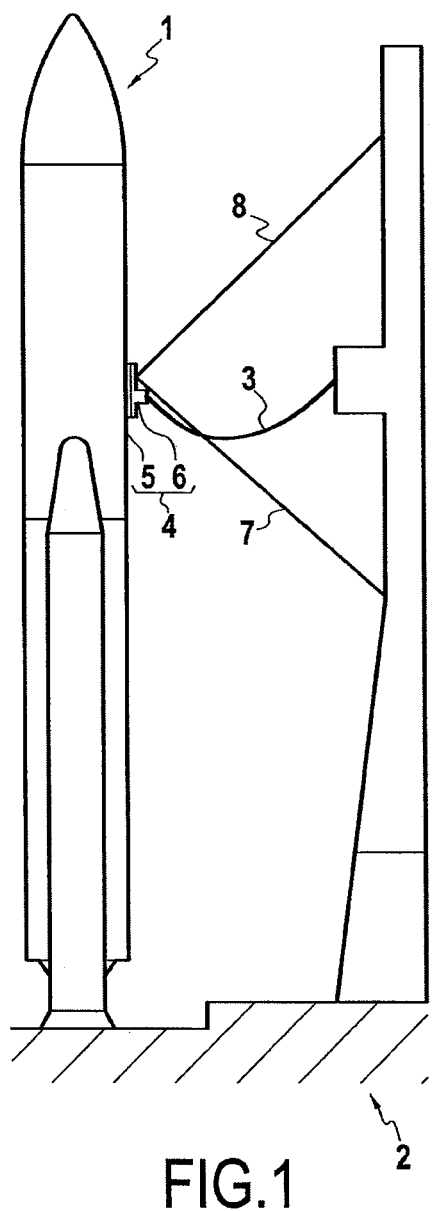
FIG. 1 is a diagram showing a space launcher on its launch pad prior to launch.
Figure 2:
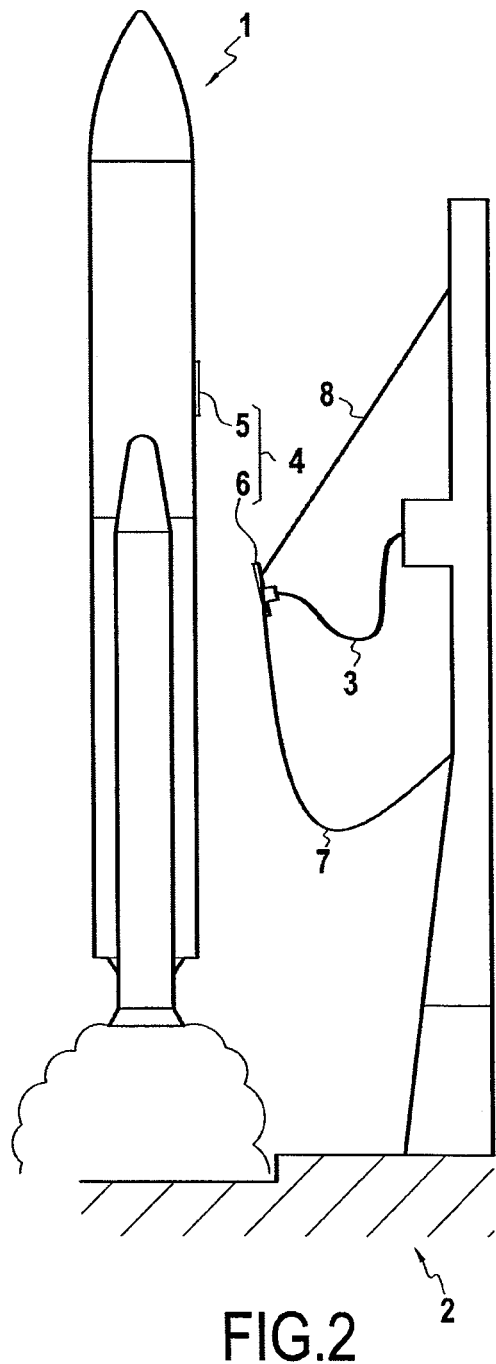
FIG. 2 is a diagram showing the FIG. 1 space launcher during an initial liftoff stage.

FIG. 1 shows a liquid propellant rocket 1 for launching satellites on its launch pad 2 prior to liftoff. In this position, the rocket 1 is connected for feeding with propellants, and also for example with pressurization gas and/or electricity, to umbilical ducts 3 via a feeding device 4 having mutually complementary connectors 5, 6 that are locked together and fastened respectively to the rocket 1 and to the umbilical ducts 3. Such complementary connectors 5, 6 are commonly referred to as "valve plates" because they are fitted with valves serving to stop fluid flowing when they are separated. A traction line 7 connecting the connector 6 on the ground side to the launch pad 2 serves to trigger unlocking and separation of the complementary connectors 5, 6 during liftoff of the rocket 1, as shown in FIG. 2. In addition, a spacer device 8 for moving the connector 6 away may serve to facilitate separating the complementary connectors 5, 6 after they have been unlocked during liftoff of the rocket 1. In the embodiment shown, this spacer device 8 is constituted merely by an additional traction line serving to connect these ground-side type connectors 6 to a point of the launch pad 2 that is higher up and that is laterally offset from the rocket 1, so that when the connector 6 drops merely under gravity after unlocking its connection with the complementary connector 5, that will also lead to the connector performing a lateral movement moving it away from the rocket 1. Nevertheless, other alternative configurations could also be envisaged, e.g. such as rigid arms that tilt laterally.

Figure 3A:
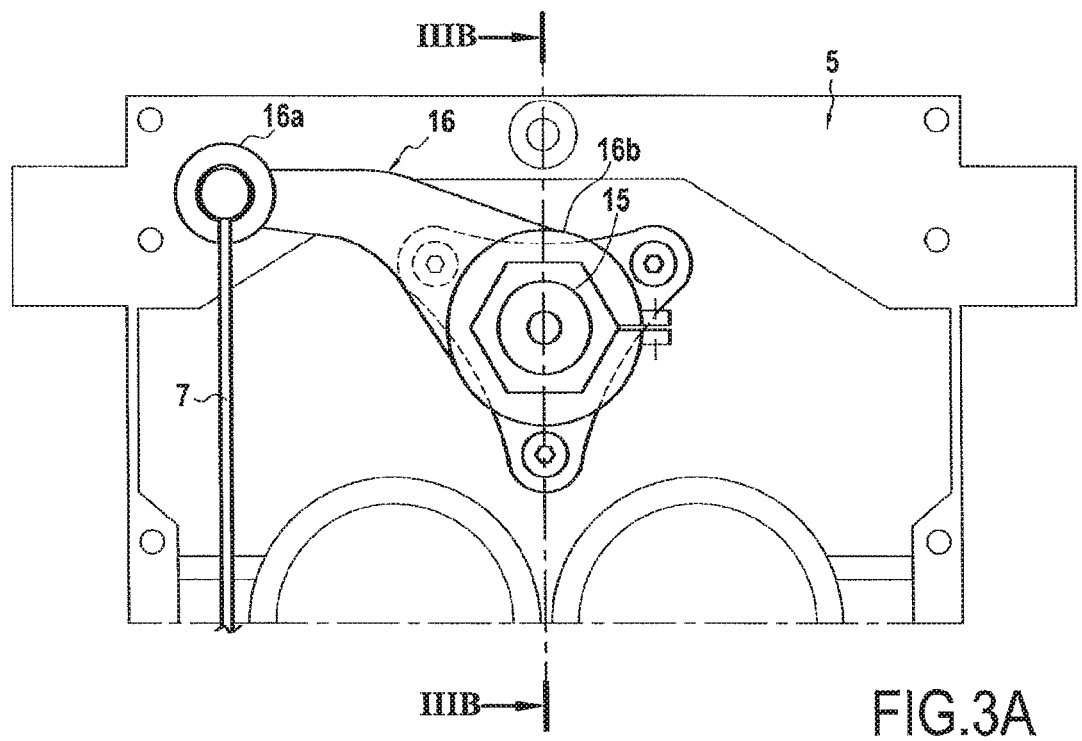
FIG. 3A is a front view of a pair of mutually complementary feeding connectors of a feeding device in an embodiment of the invention, while in the locked position.
Figure 3B:
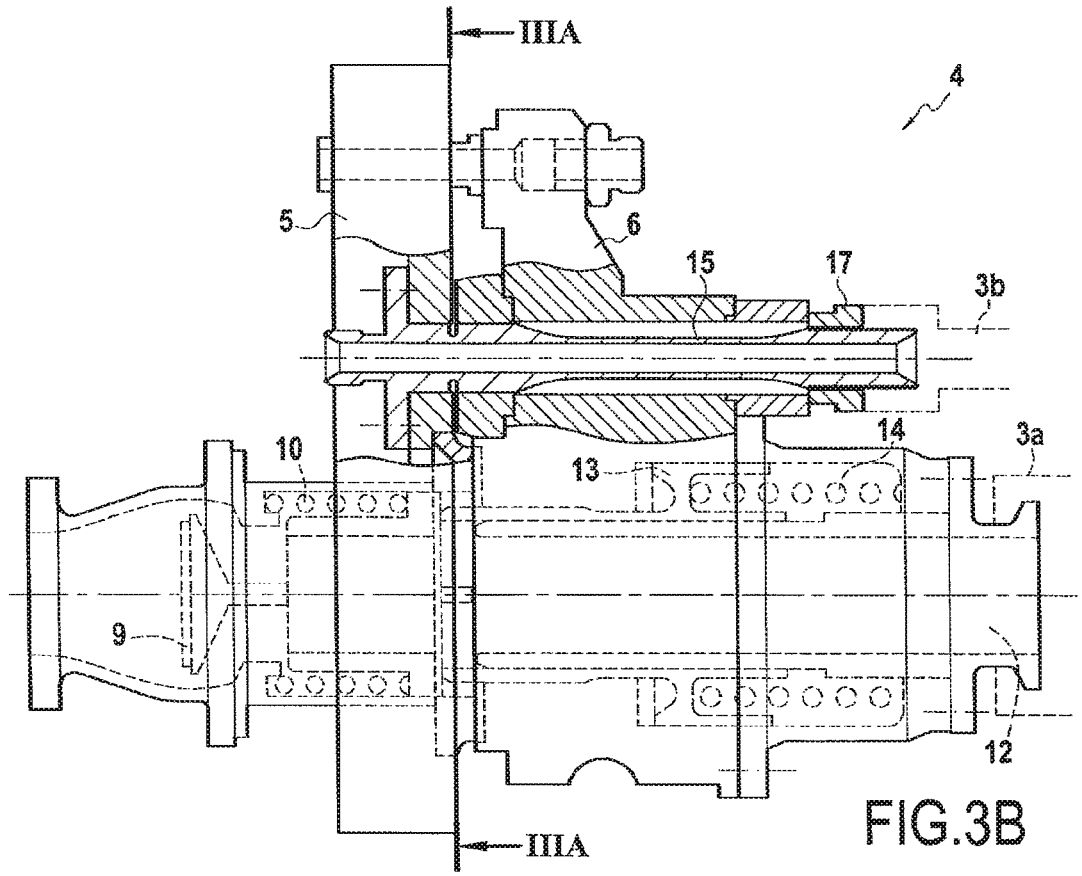
FIG. 3B is a longitudinal section view on line B-B showing the feeding connectors of FIG. 3A.

FIGS. 3A and 3B show the feeding device 4 in detail. In the feeding device 4, the feeding connector 5 is secured to an outside wall of the rocket 1, and in the embodiment shown, it is connected by ducts to first and second propellant tanks and also to a pressurization gas tank (not shown) in order to feed them. The connector 5 is also provided with valves 9 for isolating the propellant tanks when it becomes separated from the complementary connector 6. Each valve 9 has a spring 10 exerting bias in the direction for closing the valve 9.

In the embodiment shown, the ground-side feeding connector 6 has ducts 12 connected to umbilical ducts 3a for feeding propellants. A slide 13 is mounted around each of the propellant ducts 12 facing actuator surfaces of the valves 9. These slides 13 are also provided with springs 14, which exert bias in the direction opposite to the springs 10 of the valves 9. Thus, by pushing against the actuator surfaces of the valves 9, the slides 13 serve to hold them in the open position so long as the connection between the connectors 5 and 6 is maintained. The ground-side connector 6 may also be provided with valves (not shown) for stopping the flow of these fluids when the connectors 5 and 6 separate.

In order to provide the connection between the connectors 5 and 6, the feeding device 4 includes in particular a breakable connection member 15, having a first end 15a secured to the rocket-side connector 5, a second end 15b secured to the ground-side feeding connector 6, and a breakable section 15c situated between said first and second ends 15a and 15b. The feeding device 4 also includes a force transmission member 16 suitable for transmitting a breaking load to said breakable section 15c of the connection member 15.

Figure 4:
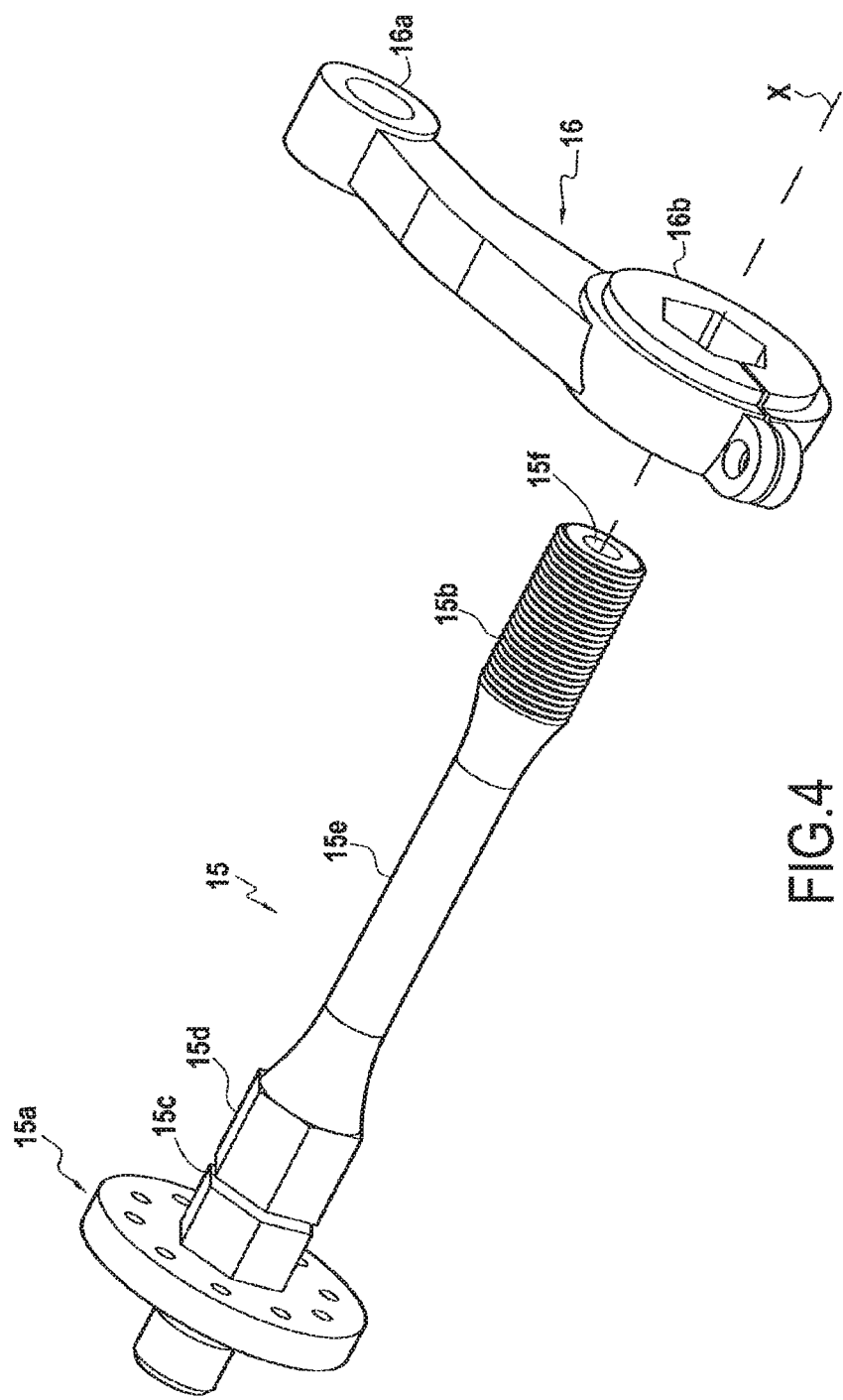
FIG. 4 is a perspective view of the device for unlocking the feeding connectors of FIGS. 3A and 3B.

In the embodiment shown, the force transmission member 16 is in the form of a lever having a distal end 16a connected to the traction line 7 and a proximal end 16b constrained in rotation with the connection member 15. The lever is arranged to turn about its proximal end 16b in a plane substantially perpendicular to the main axis X of the connection member 15. In order to transmit a breaking load in twisting to the breakable section 15c of the connection member 15, the proximal end 16b of the force transmission member 16 is engaged on a segment 15d of the connection member 15 that is of prismatic section. As shown in FIG. 4, the breakable section 15c of the connection member 15 is directly interposed between the prismatic section segment 15d and a segment of the first end 15a of the connection member 15, which is likewise prismatic and received in a cavity of complementary section in the connector 15 in order to constrain them in rotation relative to the connector 5. The breakable section 15c is thinner than the prismatic section of the segment 15d or of the first end 15a of the connection member 15 so as to ensure that the connection member 15 breaks at this location when a breaking load in twisting is transmitted by the force transmission member 16 to the connection member 15. Furthermore, the connection member 15 also presents a prestress segment 15e between its prismatic section 15d and its second end 15b, which prestress segment is fastened to the ground-side connector 6 by a nut 17. This prestress segment 15e serves to establish tension prestress between the two ends 15a and 15b of the connection member 15, thus pushing the complementary connectors 5 and 6 against each other in order to ensure that they are connected together in leaktight manner. Furthermore, the prestress segment 15e also presents a certain amount of elasticity in twisting so as to enable the prismatic section 15d to turn to a limited extent relative to the second end 15b of the connector.

The connection member 15 shown is also hollow, with the duct 15f passing through it from one end to the other, which duct may also serve for feeding fluid. Thus, in the embodiment shown, the duct 15f is connected to a duct 3b for feeding pressurized gas. It is nevertheless not excluded that in other embodiments the duct 15f passing through the connection member 15 might be used for feeding propellants or other fluids or services.

Figure 5A:
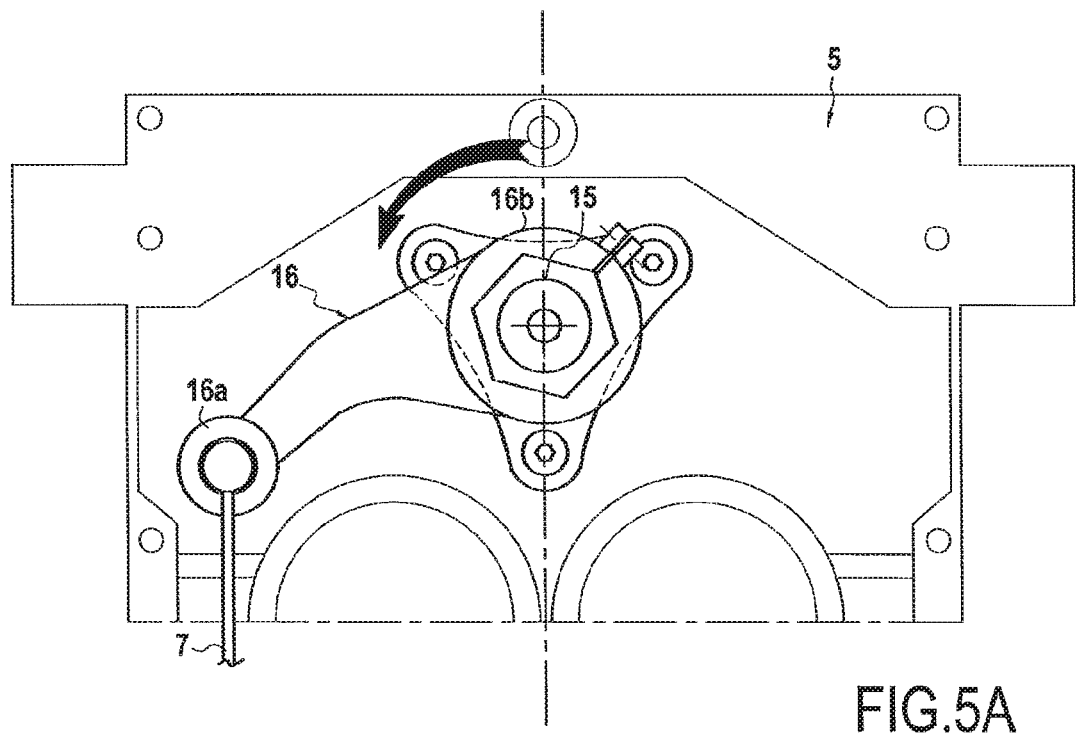
FIG. 5A is a front view of the feeding connectors of FIGS. 3A and 3B during unlocking.
Figure 5B:
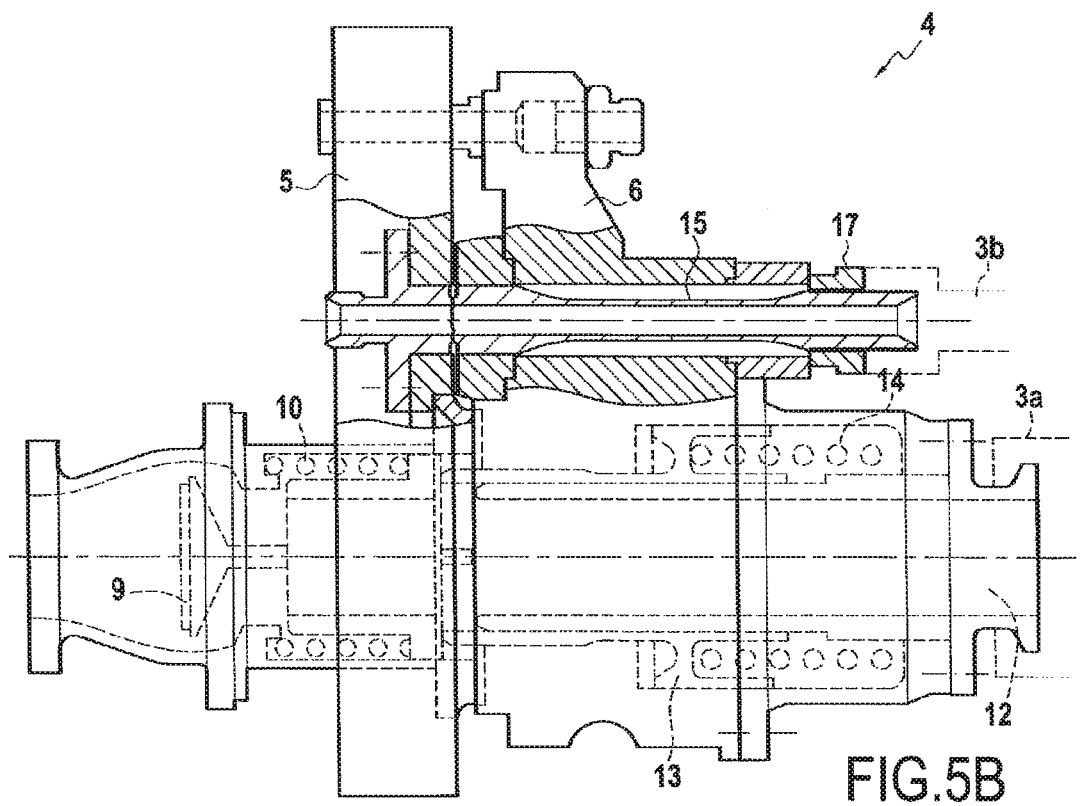
FIG. 5B is a longitudinal section view of the feeding connectors of FIG. 4A.
Figure 6:
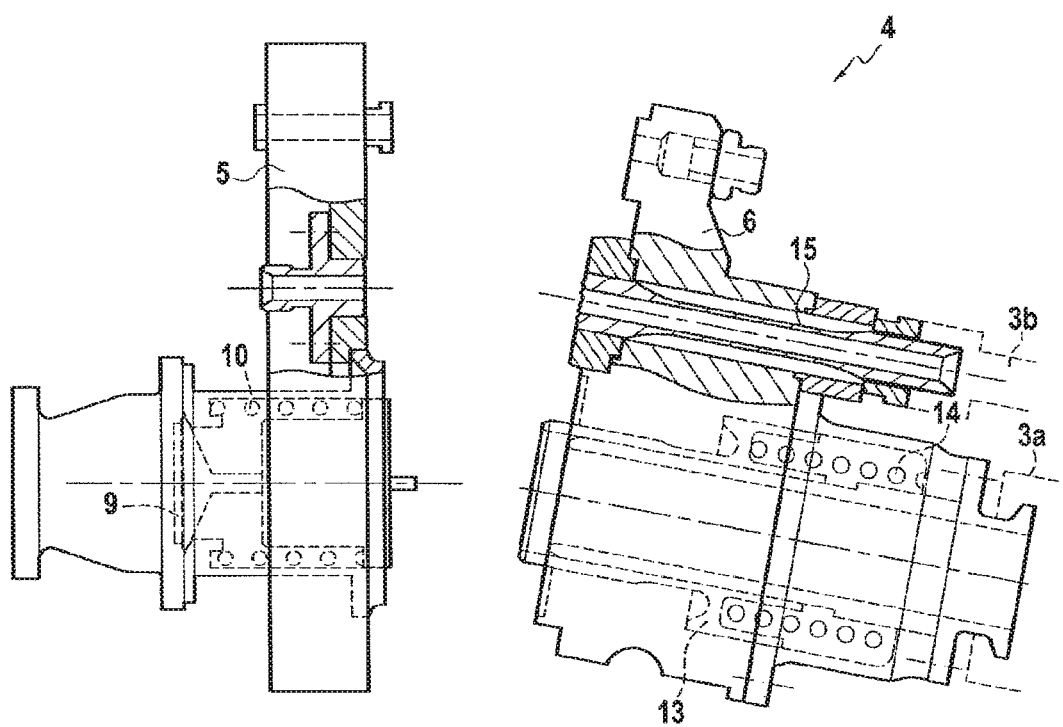
FIG. 6 is a longitudinal section view of the feeding connectors of FIGS. 3A to 4B after unlocking.

The unlocking of the feeding device is explained with reference to FIGS. 5A, 5B, and 6. In FIG. 5A, it can be seen how the lever forming the force transmission element 16 turns about the main axis X of the connection member 15 as a result of traction on the traction line 7, which traction may be caused in particular by the rocket 1 lifting off and moving vertically relative to the launch pad 2. As can be seen in FIG. 5B, this turning of the force transmission element 16, as transmitted to the breakable section 15c of the connection member 15 via its prismatic section 15d, causes the connection member 15 to break at this location, separating the two ends 15a and 15b of the connection member 15 and thus unlocking the connection between the two connectors 5 and 6. As a result of this unlocking, the prestresses in the springs 10 and 14 contributes to spacing apart the two ends 15a and 15b of the connection member 15, and thus the two connectors 15a and 15b, as shown in FIG. 6, and in the context of the rocket 1 lifting off, in FIG. 2.

In this way, the feeding connectors 5 and 6 are unlocked in a manner that is simple and reliable in response to the rocket 1 actually lifting off, thus making it possible to replace prior art devices which require unlocking to take place prior to igniting the rocket 1, with the above-mentioned drawbacks in the event of launch being aborted after such unlocking.

Although the present invention is described with reference to a specific embodiment, it is clear that various modifications and changes may be applied to these embodiments without going beyond the general ambit of the invention as defined by the claims. In particular, it is possible to envisage making use of a breaking load in traction and/or in bending in addition to the twisting used in this embodiment in order to break the connection member of the feeding device. In addition, individual characteristics of the various embodiments mentioned may be combined in additional embodiments. Consequently, the description and the drawings should be considered as being illustrative rather than restrictive.

The invention claimed is:

1. A feeding device comprising at least:
   two mutually complementary feeding connectors;
   a breakable connection member connecting together the two mutually complementary feeding connectors and having a breakable section; and
   a force transmission member connected to the breakable section of the breakable connection member so as to transmit a twisting breaking load thereto in order to unlock the connection between the two mutually complementary feeding connectors, wherein the twisting breaking load is a torque about a main axis of the breakable connection member extending from an end of the breakable connection member to another end of the breakable connection member;
   wherein the main axis of the breakable connection member is offset from a central axis of the mutually complementary feeding connectors.

2. The feeding device according to claim 1, wherein the force transmission member is a lever substantially perpendicular to the main axis of the breakable connection member.

3. The feeding device according to claim 1, wherein the breakable connection member is hollow, forming a duct between the two mutually complementary feeding connectors.

4. The feeding device according to claim 1, wherein the two mutually complementary feeding connectors are configured to connect together in substantially leaktight manner feeding ducts for at least one fluid.

5. The feeding device according to claim 1, further comprising at least one resilient spring arranged so as to move said two mutually complementary feeding connectors apart after the breakable connection member has broken.

6. The feeding device according to claim 1, further comprising a traction line connected to the force transmission member.

7. An unlocking method for unlocking a feeding device, comprising a step wherein a twisting breaking load transmitted by a force transmission member breaks a breakable section of a breakable connection member, to break a connection between two mutually complementary feeding connectors of the feeding device, wherein the twisting breaking load is a torque about a main axis of the breakable connection member extending from an end of the breakable connection member to another end of the breakable connection member, wherein the main axis of the breakable connection member is offset from a central axis of the mutually complementary feeding connectors.

8. The unlocking method according to claim 7, wherein said force transmission member is a lever substantially perpendicular to the main axis of the breakable connection member connecting two ends of the connection member together, the lever transmitting the twisting breaking load to the breakable connection member.

* * * * *